Oct. 17, 1939.  G. HUHN  2,176,816
PROCESS OF ASSEMBLING PACKINGS, LININGS, AND THE LIKE
Filed Sept. 21, 1936
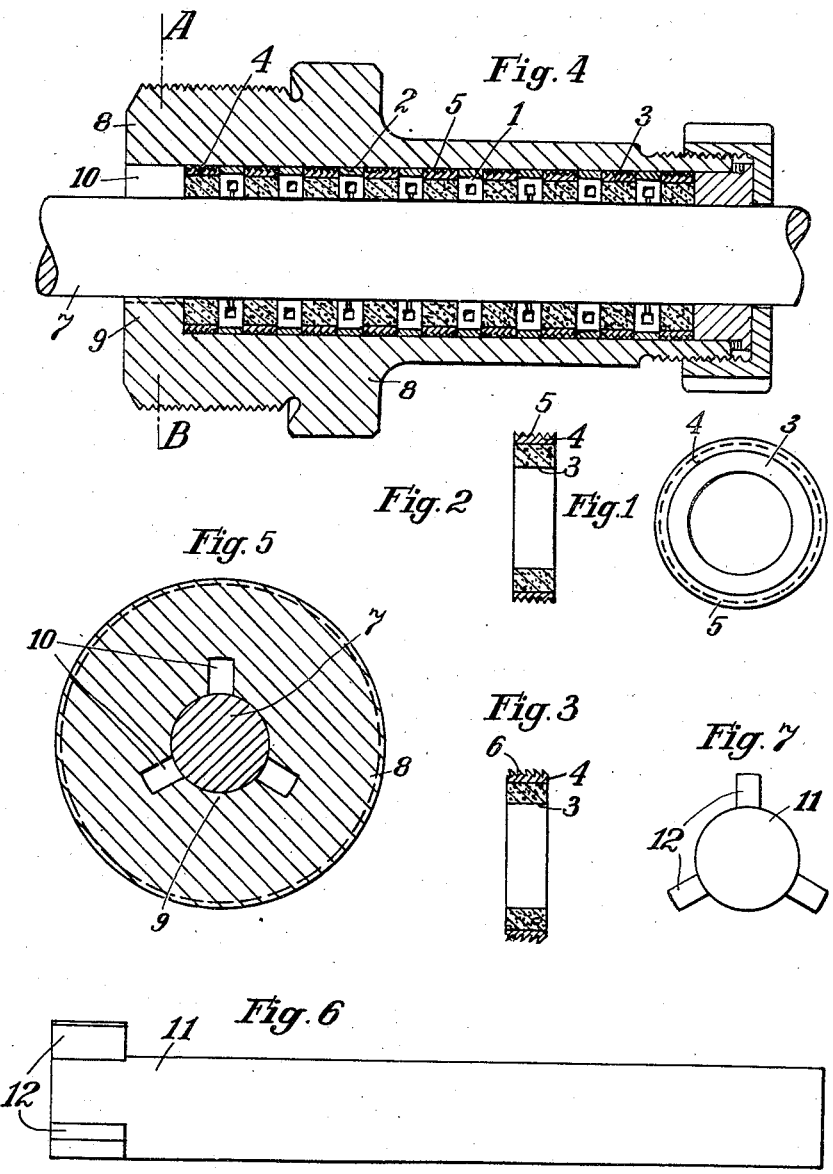
Inventor:
Gustav Huhn
Attorneys Patented Oct. 17, 1939

2,176,816

UNITED STATES PATENT OFFICE 2,176,816

PROCESS OF ASSEMBLING PACKINGS, LININGS, AND THE LIKE

Gustav Huhn, Berlin-Tempelhof, Germany

Application September 21, 1936, Serial No. 101,886
In Germany October 3, 1935

4 Claims. (Cl. 29—84)

The present invention relates to a process for the manufacture of packing, cylinder lining or the like, in which a graphite carbon inner ring is yieldably held under compression at working temperatures by means of an undivided metal jacket ring. The desirability of graphite carbon packing rings has long been known and while they have proven practicable for installations in which no high temperatures are necessary, difficulties have been encountered in adapting them for use in machines in which high operating temperatures are essential, notably steam engines and turbines driven by superheated steam. These difficulties have arisen from the hard and brittle nature of graphite carbon and from the inability of this material to expand appreciably under the influence of heat. Due to said hard and brittle nature and said inability to expand under heat, a simple graphite carbon ring of a diameter to snugly surround a piston rod at pre-operating temperatures, will be broken when said rod expands under operating temperatures. If, in order to prevent this, such clearance be provided that the rod may expand without touching the packing ring until expansion of said rod has ceased, the clearance will permit leakage, and is, therefore, impracticable. The possibility of holding the graphite carbon packing ring against breakage upon rod expansion by simply placing a metal jacket ring around said packing ring, does not exist, for as the rod expands under heat, the jacket ring also expands. The jacket ring thus moves away from and does not support the graphite carbon ring, and again this ring will be broken by the expanding rod.

For the above reasons, it has been impossible to make practical use of graphite carbon rings for packings, bearings and the like, in installations having high operating temperatures. These difficulties are overcome by the present invention and it has been made possible thereby to produce a jacketed graphite carbon packing ring which will perfectly fit the rod at pre-operating temperatures, will expand without breakage as the rod expands under operating temperatures, will contract as the rod contracts upon cooling, and will remain in proper contact with the rod until worn out.

My process makes the above results possible by causing a metal jacket ring to place a hard and brittle graphite carbon ring under resilient circumferential compression and hold it under such compression at all pre-operation and operating temperatures. Thus, the graphite carbon ring may be initially fitted to the cool rod, and as said rod expands under the influence of operating temperatures, said metal jacket ring also expands under the same influence, and said graphite carbon ring, incapable of expanding under the influence of heat, will expand under the influence of the compression stored therein, with no danger of breakage. Moreover, the process stores sufficient compression in the graphite carbon ring to prevent it from loosening in the jacket ring even when the latter expands to the maximum under operating temperatures. Upon cooling and contraction of the rod, the jacket ring also cools and contracts, and said jacket ring thus gradually restores maximum compression in the graphite carbon ring, thereby gradually decreasing the diameter of this ring and keeping it in proper contact with the shaft.

The combined packing or cylinder lining according to my present invention is to be manufactured in the following manner:

A metal jacket ring is shrunk around a graphite carbon ring with such intensity as to compress said graphite carbon ring and reduce its diameter, whereby when the packed machine part or the like and the jacket ring expand under operating temperatures, said graphite carbon ring, not capable of appreciably expanding under the influence of heat, will expand under the influence of its compression. Preferably, for attaining this end, the graphite carbon and metal jacket rings to be associated are formed of such diameters that said graphite carbon ring cannot be inserted into said metal jacket ring until the latter is heated to an abnormal temperature above the maximum working temperature encountered after installation. Said metal jacket ring then is heated to said abnormal temperature, and said graphite carbon ring is inserted into said abnormally heated metal jacket ring. Upon cooling and consequent contraction of said metal jacket ring, the latter will place said graphite carbon ring under compression, and operating temperatures cannot expand said metal jacket ring sufficiently to free said graphite carbon ring from said compression.

In the same manner, bearings, cylinder linings and rod or shaft packings may be made by my new process, using cylinders or rings of graphite carbon for the inner part and metal jacket rings or cylinders, respectively, for the outer or jacketing part of the combined structure to be manufactured.

The outer metal jacket ring or cylinder may be made of stainless steel, iron, bronze or any other metallic material of high strength and considerable expanding capacity under heat.

The products of my new process may be used for various purposes, such as packing for the piston rods of fast running reciprocating engines working with superheated steam of extremely high pressure, as oilless bearings, as a lining for cylinders of reciprocating steam engines, air compressors, internal combustion engines and the like. In all these cases, the excellent lubricating and sliding quality of graphite carbon is utilized, so that no lubrication by oil will be required, and a perfect fit of the graphite carbon rings or cylinders is maintained at all working temperatures, low as well as high.

In the accompanying drawing, Fig. 1 shows a view of a ring produced according to my invention; Fig. 2 is a cross section through this ring; Fig. 3 is a cross section through another form of the ring; Fig. 4 is a stuffing box provided with such rings; Fig. 5 is a section taken on line A—B of Fig. 4; Fig. 6 is a side view of an auxiliary tool; and Fig. 7 is an end view of said tool.

In all the embodiments shown, the graphite carbon part of the ring is denoted at 3 and its metal jacket at 4. As shown in the drawing, this metal jacket may be provided on its outer surface with dents, points or sharpened fins or ribs 5. By this arrangement, the adjustment of the rings in the packing chamber, bearing housing, cylinder or the like is facilitated and improved. The interstices between the dents or ribs 5 may be caulked with graphite or the like to further improve the seal. Whereas, according to Fig. 2, the dents 5 stand radially, they may also be arranged in an oblique direction, as shown at 6 in Fig. 3. By this latter arrangement, the elasticity between the cylinder casing and the jacketed ring is increased.

In the stuffing box shown in Figs. 4 and 5, the jacketed graphite carbon rings 3, 4 are arranged alternating with hollow copper rings 1, filled in a known manner with graphite and surrounded with covering rings 2 of steel or the like.

The removal or replacement of the very small packings from the stuffing box of a reciprocating steam engine working with superheated steam of extremely high pressure is very difficult. To facilitate the removal of the packing, the bottom 9 of the packing chamber or stuffing box 8 is provided with a number of slots 10 (Figs. 4 and 5) in a suitable arrangement. If the packing is to be removed, first the piston (not shown) is drawn out with the piston rod 7, after the latter is disengaged from its cross head also not shown. Then the cover of the stuffing box 8 is removed and the stripping tool 11 (Figs. 6 and 7) is introduced from the cylinder side into the interior of the stuffing box 8. This stripping tool 11 is provided at one end with fins or ribs 12 of equal arrangement and spacing with the slots 10 of the bottom, in such a manner that these ribs 12 of the tool 11 can be introduced through said slots 10 into the interior of the stuffing box 8. By striking with a hammer, the other end of the tool 11, the packing composed of the alternating rings 3, 4 and 1, 2, respectively, is driven forward as a whole out of the packing chamber. As the steel jackets 4 of the graphite carbon rings 3, during this action, abut on the steel jackets 2 of the copper rings 1, any damage to the graphite carbon parts 3 or to the copper parts 1 is prevented.

If the jacketed graphite carbon rings or hollow cylinders are used as oilless bearings or cylinder linings, the metal jacket is preferably provided with the points, dents, ribs or the like as shown in Figs. 2 and 3 at 5 and 6, and this may be done, too, where hollow cylinders of greater height are used to construct the bearing or the cylinder lining.

In manufacturing, for instance, a combined ring as that shown in Figs. 1 and 2, the following steps are to be made:

(1) Forming the graphite carbon and metal jacket rings 3 and 4 of such diameters that said graphite carbon ring 3 cannot be inserted into said metal jacket ring 4 until the latter is heated to an abnormal temperature above the maximum working temperature encountered after installation;

(2) Heating said metal jacket ring 4 to said temperature, and (3) Inserting said graphite carbon ring into the abnormally heated metal jacket ring 4.

I claim:

1. A process for the manufacture of a packing, cylinder lining or the like, in which a graphite carbon inner ring is yieldably held under compression at working temperatures by means of an undivided metal jacket ring; said process comprising the steps of forming said graphite carbon and metal jacket rings of such diameters that said graphite carbon ring cannot be inserted into said metal jacket ring until the latter is heated to an abnormal temperature above the maximum working temperature encountered after installation; heating said metal jacket ring to said abnormal temperature; and inserting said graphite carbon ring into the abnormally heated metal jacket ring; whereby upon cooling and consequent contraction said metal jacket ring will place said graphite carbon ring under compression and operating temperatures cannot expand said metal jacket ring sufficiently to free said graphite carbon ring from said compression.

2. A process for the manufacture of a packing, cylinder lining or the like in which a graphite carbon inner cylinder is yieldably held under compression at working temperatures by means of an undivided metal jacket cylinder; said process comprising the steps of forming said graphite carbon and metal jacket cylinders of such diameters that said graphite carbon cylinder cannot be inserted into said metal jacket cylinder until the latter is heated to an abnormal temperature above the maximum working temperature encountered after installation; heating said metal jacket cylinder to said abnormal temperature; and inserting said graphite carbon cylinder into the abnormally heated metal jacket cylinder; whereby upon cooling and consequent contraction said metal jacket cylinder will place said graphite carbon cylinder under compression and operating temperatures cannot expand said metal jacket cylinder sufficiently to free said graphite carbon cylinder from said compression.

3. A process for the manufacture of a packing, cylinder lining or the like having a graphite carbon ring to surround a metal machine part; said process consisting in shrinking a metal jacket ring around said graphite carbon ring with such intensity as to compress said graphite carbon ring and reduce its diameter, whereby when the above mentioned machine part and the jacket ring expand under operating temperatures, said graphite carbon ring, not capable of appreciably expanding under the influence of heat, will expand under the influence of its compression.

4. A process for the manufacture of a packing, cylinder lining or the like having a graphite carbon cylinder to surround a metal machine part; said process consisting in shrinking a metal jacket cylinder around said graphite carbon cylinder with such intensity as to compress said graphite carbon cylinder and reduce its diameter, whereby when the above mentioned machine part and the jacket cylinder expand under operating temperatures, said graphite carbon cylinder, not capable of appreciably expanding under the influence of heat, will expand under the influence of its compression.

GUSTAV HUHN.